United States Patent [19]

Schermutzki

[11] 4,154,379
[45] May 15, 1979

[54] APPARATUS FOR USE IN PRODUCING DROPLETS

[75] Inventor: Konrad Schermutzki, Remseck am Neckar, Fed. Rep. of Germany

[73] Assignee: Sandvik Conveyor GmbH, Fellbach, Fed. Rep. of Germany

[21] Appl. No.: 821,088

[22] Filed: Aug. 2, 1977

[30] Foreign Application Priority Data

Aug. 5, 1976 [DE] Fed. Rep. of Germany ....... 2635147

[51] Int. Cl.² .............................................. B01J 2/04
[52] U.S. Cl. ...................................... 222/420; 264/9; 264/13
[58] Field of Search ............... 222/420, 394, 395, 401, 222/386.5, 339, 422; 264/9, 13; 266/202; 425/DIG. 230; 346/75

[56] References Cited

U.S. PATENT DOCUMENTS

| | | | |
|---|---|---|---|
| 1,878,220 | 9/1932 | Willshaw et al. | 222/207 UX |
| 2,931,067 | 4/1960 | Delaloye et al. | 264/14 |
| 4,030,640 | 6/1977 | Citrin et al. | 222/209 X |

FOREIGN PATENT DOCUMENTS

2527301  1/1976  Fed. Rep. of Germany ............. 264/13

*Primary Examiner*—David A. Scherbel

[57] ABSTRACT

A system for producing droplets of a liquid, particularly for pelletizing the material. The liquid is delivered under a controlled pressure to a relatively shallow horizontal chamber, the lower wall of which is a plate having nozzles therein and the top wall of which is formed by a flexible diaphragm. There is a chamber above the flexible diaphragm which contains oil and connects through its top wall to a chamber of variable volume having a bellows side wall construction and a movable top wall. The oil also fills that chamber so that when the movable top wall is pushed downwardly, a uniform pressure is exerted on the diaphragm so as to press it downwardly and to cause a drop of the liquid to be discharged from each of the nozzle. The movable top wall is vibrated or oscillated vertically so as to produce a continuous series of droplets from each nozzle. The droplets can be solidified by falling through a heat transfer gas or by falling onto a steel belt conveyor which is cooled on its underside by a brine spray.

8 Claims, 1 Drawing Figure

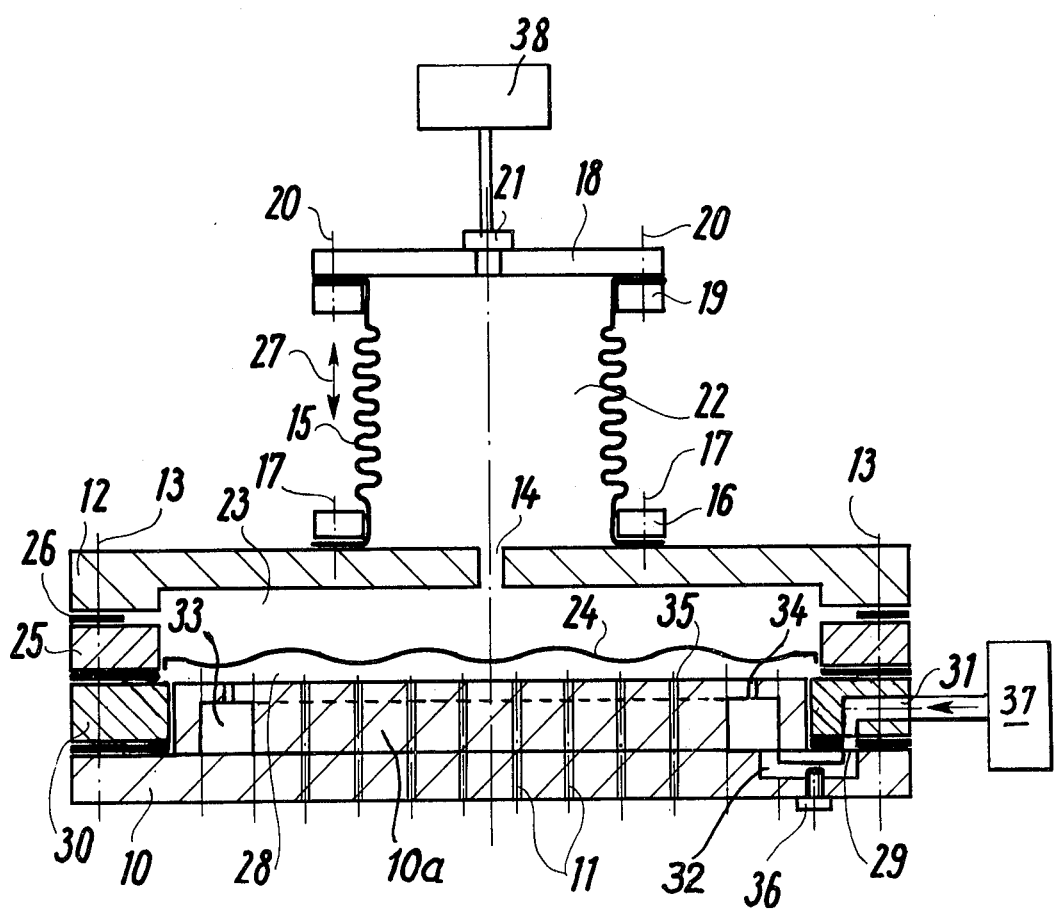

APPARATUS FOR USE IN PRODUCING DROPLETS

This invention relates to forming droplets from a liquid and more particularly to pelletizing a liquid or viscous material by extruding it through nozzles from droplets and to then cool the droplets. This invention relates particularly to apparatus for manufacturing solid particles, such as spherical pellets, by extrusion of droplets of liquid or viscous material through nozzles and then solidifying the droplets. A body of the liquid or viscous material is delivered to a chamber above the nozzles and having a controlled variable volume, to pulsating pressure fluctuations, and the individual volumes discharged by the nozzles being allowed to solidify.

In prior art apparatus of the type referred to above (see German published applications No. 1,259,302 and No. 1,198,793), pulsating pressure fluctuations are produced by a piston which reciprocates in a cylinder and in so doing comes into direct contact with the liquid or viscous material to be extruded. This gives rise to sealing problems, particularly when the liquid or viscous material to be processed is a product which forms gases or which sublimates. Such volatile constituents may escape to the outside and pose a nuisance in the form of an unpleasant odor or air contamination. A further drawback of such prior art apparatus is the wear and fouling of the parts, particularly the piston and the cylinder, which come in direct contact with the material being processed. Also, such parts must be cleaned whenever there is a change in product to be processed, with the machine being out of service.

It has also been proposed (see German patent application No. P 25 57 541.1-41) to produce the pulsating pressure fluctuations in the mass being processed by interposing in the feeding device for the material being processed a chamber whose walls are elastically deformable under the action of an external actuating device. Illustratively, a bellows is used as a chamber having a variable volume. In this proposed arrangement, the drawbacks of some prior art apparatus are avoided, in that the material being processed does not contact moving parts, and the sealing problem is largely solved.

The present invention has as an object to provide an improved solution to the sealing problem. Moreover, the invention seeks to facilitate the cleaning of the apparatus, as in the case of a product changeover, and to avoid or at least reduce contact between the material being processed and the parts producing the pulsating pressure fluctuations.

In accordance with the present invention, a horizontally disposed layer of the material being processed is confined within a chamber above the nozzles having an elastic or flexible top wall or partition which is acted upon by a pressure medium subjected to pulsating pressure fluctuations, and by feeding the liquid or viscous material to be processed to the periphery of the chamber. The elastic or flexible partition is advantageously constructed as a membrane and is of metal or plastic.

This invention offers in particular the following advantages: The volume of the material between the feed device and the nozzle discharge orifices can be kept small. As a result, the filling-level pressure in the material being processed is low and thus permits large nozzle cross-sections even in the case of low-viscosity products without posing the danger of an inflow of air through the nozzles. A further substantial advantage of the invention is that, with the exception of the one side of the elastic partition which faces the product, the parts producing the pulsating pressure fluctuations do not come in contact with the product being processed, and do not require cleaning. Moreover, the elastic partition provides an airtight seal between the product being processed and the parts producing the pressure fluctuations. Since the product being processed does not flow through the parts producing the pulsating pressure fluctuations, these need not be maintained at a temperature corresponding to that of the melt being processed.

While it is not intended to impose on the person skilled in the art restrictions as to the choice of the pressure medium acting upon the back of the eleastic or flexible partition, it has been found that it is advantageous to use an incompressible liquid, and particularly hydraulic oil, as the pressure medium. Since the pressure medium is hermetically sealed from the product being processed by the partition, the structure containing the nozzles can be removed without disturbing the body of pressure medium. That permits the necessary cleaning of the apparatus when changing the material being processed, or changing the size of the nozzles.

In accordance with a further characteristic of the invention, the space beyond the back of the elastic partition which contains the pressure medium can be formed at least in part by a bellows which is adapted to be expanded back and forth along its longitudinal axis so as to produce reductions and increases in its effective length, and hence a corresponding cyclical change in the total volume of the space containing the pressure medium. Such a bellows offers a substantial advantage over a cylinder with a reciprocating piston, which in principle may also be used to produce the pressure fluctuations, that it can be completely closed, which does away with the moving sealing problems.

The single FIGURE of the drawing shows somewhat schematically an embodiment of the invention with the main structure being a vertical section through an apparatus used in producing droplets which are cooled in the manufacture of solid particles or pellets. From the above and the description which follows, further details and advantages of the invention will become apparent.

Referring to the drawing, a plate 10 has mounted on it a large number of nozzles 11 which are of known construction. The material being processed is extruded from the nozzles to form droplets of the material being processed. Plate 10 is rigidly mounted upon a top plate 12 with there being a supply frame 30 and a stationary frame 25 positioned between the peripheries of the two plates. A plurality of bolts are indicated at 13 and clamp the plates and frames together into a rigid structure. Sealing means or gaskets 26 are positioned between the plates and the frames. Mounted on frame 25 is a flexible metal partition or diaphragm 24 which is positioned above the top of plate 10 to provide a relatively thin horizontal chamber 28 defined by the bottom surface of the diaphragm, the top surface of plate 10 and the lower portion of frame 25. A chamber 23 is also formed by diaphragm 24 between its top surface and the bottom surface of plate 12 and the top portion of frame 25.

A generally cylindrical bellows 15 is mounted on the top surface of plate 12 and is clamped to the plate by a ring 16 which rests upon a bottom flange of the bellows and is held in place by a plurality of screws 17. The top of bellows 15 is closed by a circular plate 18 which is clamped to the bellows by a ring 19 which clamps the flange on the top of the bellows against the bottom of plate 18. Plate 12 has a plurality of holes 14 (only one of which is shown) which extend between chamber 23 and chamber 22 formed by the bellows.

Frame 30 has at its left-hand edge a passageway 31 through which the material being processed is supplied from the constant-pressure supply system 37. Passageway 31 connects at 29 with a passageway 32 in plate 10 and passageway 32 connects with a peripheral passageway 33 in plate 10. A plurality of vertical bores 34 extend between passageway 33 and chamber 28 above plate 10. Hence, the material being processed flows through passageways 31, 32, 33 and bores 34 into chamber 28. A threaded plug 36 closes a drain opening extending from the bottom of plate 10 to passageway 32, which plug is removed to drain material being processed from plate 10 and chamber 28.

A vibrator or oscillator 38 is positioned above plate 18 and is connected to the plate through a screw plug 21. The screw plug is removed to fill chambers 22 and 23 with hydraulic oil and the screw plug is then replaced taking care to avoid the inclusion of air. The vibration unit 38 is operably connected to oscillate plate 18 and thereby cause the hydraulic oil to pass downwardly and upwardly through openings 14 during each vibration or oscillation. The hydraulic oil passing into chamber 23 pushes diaphragm 24 downwardly in a uniform manner throughout the area of the diaphragm. As the movable plate 18 moves upwardly and draws oil upwardly through openings 14, the diaphragm moves back up again. During each downward movement of the diaphragm, a drop of the material being processed is extruded from the orifice of each nozzle. During each upward movement of the diaphragm, additional material flows from passageway 31 along the path indicated above into chamber 28. As indicated above, the arrangement is such that there is even flow of the material into chamber 28 without there being a tendency for air to be drawn into the orifices of the nozzles by the vibrating or oscillating movement of the movable plate 18 and the expansion and contraction of the bellows as indicated at 27.

In this embodiment, plates 10 and 12 and frames 25 and 30 are of circular configuration. However, the invention contemplates that they may be square or rectangular or other configuration when desirable.

When the apparatus is in operation, the chamber 28 is filled with the liquid or viscous material to be processed, and the pulsating pressure fluctuations are transmitted by partition 24 from the hydraulic oil to the material being processed. That causes the material to be extruded from the orifices of nozzle 11 and separated to form uniform drops. As plate 18 moves upwardly, the feeding pressure at bores 34 is sufficient to supply material to chamber 28 to replace the material extruded in the next previous downward movement of the diaphragm. However, that feeding pressure is not great enough to interfere with or appreciably influence the cyclical rising and falling of pressure produced by the action of bellows 15. The throttling bores 34 supply the materials to chamber 28 evenly from the annular passageway 33.

When the apparatus is first put into service, any air is displaced by the material being processed. It has been pointed out above that plate 10 can be removed and all of the orifices above the plate which have been contacted by the material to be processed are exposed and can be cleaned readily. Another plate with other nozzles can then be installed and the apparatus will be in condition for service with another material.

The invention contemplates that a steel belt conveyor is positioned beneath nozzles 11 and that the droplets from the nozzles are cooled by the action of the brine spray from the bottom of the conveyor.

I claim:

1. In apparatus for producing droplets comprising, the combination of, means forming a bottom wall with a plurality of orifices which are adapted to permit the material to flow therethrough and form droplets, a flexible diaphragm providing a continuous movable wall parallel to the top surface of said bottom wall and spaced therefrom a predetermined distance to provide a chamber for a horizontal layer of said material, a peripheral wall structure attached to the periphery of said diaphragm and supporting the same and cooperating with said bottom wall to close said chamber between said diaphragm and said bottom wall, said structure including means to deliver said material to said chamber evenly around the periphery of the chamber, means forming a horizontally extending upper chamber above said diaphragm, means forming a closed variable-volume chamber connected to said upper chamber with said variable-volume chamber and said upper chamber being adapted to receive a hydraulic liquid and to produce a pressure-transmitting system, means to supply material being processed to the first-named of said chambers at a controlled pressure, and means to vary the volume of said variable-volume chamber to produce pulsating pressure fluctuations in said upper chamber to thereby move said diaphragm and change the volume of said first-named chamber whereby said material being processed is extruded from said orifices to produce droplets.

2. The system as described in claim 1, wherein said hydraulic liquid is a body of hydraulic oil filling said upper chamber and said variable-volume chamber.

3. The system as described in claim 2, wherein said variable-volume chamber includes a bellows and a movable plate which is moved to vary the volume of said bellows.

4. The system as described in claim 3, wherein said diaphragm comprises a metal sheet.

5. The system as described in claim 4, wherein said means to deliver said material being processed to said first-named chamber comprises a plurality of throttling bores at the periphery of said first-named chamber.

6. Apparatus as described in claim 1 wherein said peripheral wall structure comprises a first frame means positioned against the periphery of said bottom wall and a second frame member positioned around the periphery of said upper chamber, and wherein the structure includes a top plate positioned upon said second frame member and supporting said means forming said variable-volume chamber, said top plate having an opening interconnecting said upper chamber and said variable-volume chamber.

7. Apparatus as described in claim 6, wherein said means forming said variable-volume chamber comprises a cylindrical bellows having a vertical axis and a movable top plate closing the upper end of said bellows, and means to impart pulsating movement to said movable top plate to thereby change the volume of said variable-volume chamber.

8. Apparatus as described in claim 7, wherein said first frame means has a passageway through which said material is supplied to said first-named chamber which includes a peripheral passageway and a plurality of bores extending therefrom to said first-named chamber.

* * * * *